(12) United States Patent
Latva-Kokko

(10) Patent No.: US 10,744,471 B2
(45) Date of Patent: Aug. 18, 2020

(54) MIXING APPARATUS AND ITS USE

(71) Applicant: OUTOTEC (FINLAND) OY, Espoo (FI)

(72) Inventor: Marko Latva-Kokko, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 341 days.

(21) Appl. No.: 15/510,125

(22) PCT Filed: Sep. 15, 2015

(86) PCT No.: PCT/FI2015/050610
§ 371 (c)(1),
(2) Date: Mar. 9, 2017

(87) PCT Pub. No.: WO2016/042204
PCT Pub. Date: Mar. 24, 2016

(65) Prior Publication Data
US 2017/0291156 A1 Oct. 12, 2017

(30) Foreign Application Priority Data

Sep. 16, 2014 (FI) .................... 20145808

(51) Int. Cl.
*B01F 7/22* (2006.01)
*B01F 15/00* (2006.01)
(Continued)

(52) U.S. Cl.
CPC .......... *B01F 15/00896* (2013.01); *B01F 7/22* (2013.01); *B01F 15/00883* (2013.01);
(Continued)

(58) Field of Classification Search
CPC ....................................................... B01F 7/22
(Continued)

(56) References Cited

U.S. PATENT DOCUMENTS 64,971 A * 5/1867 Gray ............... B01F 7/1675
366/306
738,560 A * 9/1903 Miller ............. B01F 7/1675
366/306
(Continued)

FOREIGN PATENT DOCUMENTS

CN 102179195 A 9/2011
EP 1944080 A1 7/2008
(Continued)

OTHER PUBLICATIONS

Chilean Patent Application issued by the Chilean Patent Office in relation to Chilean Application No. 201700592 dated Jun. 15, 2018 (9 pages).
(Continued)

*Primary Examiner* — David L Sorkin
(74) *Attorney, Agent, or Firm* — Robert P. Michal, Esq.; Carter, DeLuca & Farrell LLP

(57) ABSTRACT

A mixing apparatus for mixing particles in a liquid and its use are disclosed. The mixing apparatus comprises a tank having a bottom and a substantially vertical side wall, an agitation means comprising a rotation shaft located vertically and centrally in the tank, and an impeller arranged at a height above the bottom at the end of the rotation shaft and the impeller being a downward pumping axial or mixed flow impeller. The bottom is equipped with a corrugated formation comprising alternate consecutive ridges and valleys, the ridges and valleys extending radially in relation to a center of the bottom, whereby the valleys concentrate and channel the mixing power near to the bottom to direct the flow of the liquid and to increase the velocity of the flow near to the bottom.

26 Claims, 6 Drawing Sheets

(51) Int. Cl.
*C22B 3/02* (2006.01)
*C22B 11/08* (2006.01)

(52) U.S. Cl.
CPC ............... *C22B 3/02* (2013.01); *C22B 11/08* (2013.01); *B01F 2215/0075* (2013.01)

(58) Field of Classification Search
USPC .............................................. 366/306, 330.1
See application file for complete search history.

(56) References Cited

U.S. PATENT DOCUMENTS

| | | | |
|---|---|---|---|
| 936,400 A * | 10/1909 | Arnold | B01F 7/1675 366/306 |
| 1,353,166 A | 9/1920 | Johnson | |
| 4,648,720 A * | 3/1987 | Trocherie | A47J 43/046 366/306 |
| 6,109,449 A | 8/2000 | Howk et al. | |
| 6,142,458 A | 11/2000 | Howk | |
| 2002/0172091 A1 | 11/2002 | Hatakeyama | |
| 2014/0036618 A1 | 2/2014 | Levecq et al. | |

FOREIGN PATENT DOCUMENTS

| | | |
|---|---|---|
| GB | 383419 A | 11/1932 |
| JP | 2003154250 A | 5/2003 |
| WO | WO-2012107704 A1 | 8/2012 |

OTHER PUBLICATIONS

Chudacek, M. W., "Solids Suspension Behaviour in Profiled Bottom and Flat Bottom Mixing Tanks", Chem. Eng. Sci., (1985), vol. 40, No. 3, pp. 385-392, XP002751598 [DA].
International Search Report issued by the European Patent Office in connection with PCT/FI2015/050610 dated Dec. 16, 2015 (4 pages).
International Preliminary Report on Patentability issued by the European Patent Office in connection with PCT/FI2015/050610 dated Jan. 9, 2017 (6 pages).
Written Opinion of the International Searching Authority issued by the European Patent Office in connection with PCT/FI2015/050610 dated Dec. 16, 2015 (6 pages).
Finnish Search Report issued by the Finnish Patent and Registration Office in relation to Patent Application No. 20145808 dated Mar. 12, 2015 (2 pages).

* cited by examiner

MIXING APPARATUS AND ITS USE

CROSS-REFERENCE TO RELATED APPLICATIONS

This application is a National Phase Entry under 35 USC § 371 of PCT Patent Application Serial No. PCT/FI2015/050610 filed Sep. 15, 2015, which claims priority to Finnish Patent Application No. 20145808, filed Sep. 16, 2014, the disclosure of each of these applications is expressly incorporated herein by reference in their entirety.

FIELD OF THE INVENTION

The present invention relates to a mixing apparatus for mixing particles in a liquid. The present invention also relates to the use of a mixing apparatus.

BACKGROUND OF THE INVENTION

Using a mixing apparatus to suspend solid particles in a liquid is a common process step in many sectors of industry. Typically a mixing apparatus comprises a tank that is a cylinder having either a flat or a dished bottom. The mixing apparatus also includes an agitator having a shaft that extends downwards from the top part of the tank and an impeller mounted at the end of the shaft near the bottom of the tank. The impeller is usually positioned at the center of the tank above the bottom and its rotation creates a movement in the liquid being mixed. Depending on the application, either an axially or radially pumping impeller or a mixed flow impeller can be used. The mixing tank additionally contains baffles which are meant to direct the flow of liquid in the desired direction and reduce vortexing.

When designing a mixing apparatus for suspending solids in a liquid, several factors need to be taken into account. First, usually a uniform suspension is ideal, which means that the mixing should be effective enough to avoid the solids from accumulating at the bottom of the tank (typically this happens in the form of fillets circulating the rim of the tank bottom). On the other hand, the energy consumption of the process increases with speed of the impeller and the mixing effectiveness of the impeller blades. Additionally, faster impeller speeds increase shear forces in the liquid and thus potentially lead to unwanted particle breakdown in certain applications.

Although impeller design has attracted research interest in increasing the mixing efficiency, the effect of the tank bottom has gained significantly less attention. Chudacek, 1985 (Chudacek, M. W. Solids Suspension Behavior in Profiled Bottom and Flat Bottom Mixing Tanks, Chem. Eng. Sci., 40: 385-392) proposed a so-called a "cone and fillet" bottom design to improve suspension efficiency compared to the flat-bottom tank design. In the design suggested by Chudacek, the impeller is positioned above the center of a flat tank bottom and a right circular cone is positioned under it so that the axis of the rotation of the impeller and the apex of the cone are vertically aligned. An oblique fillet is arranged to run along the rim of the tank bottom.

Hydrometallurgy in general means the aqueous processing of metals. It is used to harvest metals from ores and is thus important for mining industry. Especially in the leaching stage, the ore in particulate form is mixed with a leaching solution to keep the particles suspended in the solution and to maximize the contact between the ore and the liquid for efficient metal extraction. The ore particles are typically heavy and require efficient agitation to avoid sedimentation.

Currently, the mixing apparatuses used in demanding applications in hydrometallurgy have usually a dished-bottom, which functions more efficiently than a flat bottom, but is a rather expensive structure to build. Further, reduction in energy consumption and process optimization are continuous goals in mining industry to improve both the revenues for investment and environmental compatibility of the industry. The inventors have recognized the need for improving mixing efficiency while at the same time keeping energy consumption and strain on the devices as small as possible.

OBJECTIVE OF THE INVENTION

It is the objective of the invention to provide an improved mixing apparatus with a tank bottom design that improves the efficiency of mixing without increased impeller speed.

SUMMARY OF THE INVENTION

The mixing apparatus according to the present disclosure is characterized by what is presented in claim 1.

The use of the mixing apparatus according to the present disclosure is characterized by what is presented in claim 20.

According to one aspect, a mixing apparatus is provided. The mixing apparatus for mixing particles in a liquid comprises a tank having a bottom and a substantially vertical side wall. The mixing apparatus further comprises an agitation means comprising a rotation shaft located vertically and centrally in the tank, and an impeller arranged at a height above the bottom at the end of the rotation shaft and the impeller being a downward pumping axial or mixed flow impeller. The bottom of the tank is equipped with a corrugated formation comprising alternate consecutive ridges and valleys, the ridges and valleys extending radially in relation to a center of the bottom. The valleys concentrate and channel the mixing power near to the bottom to direct the flow of the liquid and to increase the velocity of the liquid flow. The structure simultaneously turns the downward flow generated by an axial impeller smoothly upwards and channels it. This increases the liquid flow velocities near the tank bottom as well as in the upward flow direction. By a downward pumping impeller is herein meant an impeller generating at least some flow towards the bottom of the tank. A downward pumping impeller can be an axial flow impeller, meaning that substantially all of the flow is generated towards the bottom. Alternatively, the downward pumping impeller can be a mixed flow impeller, generating flow to several directions, as long as some of the flow is directed towards the bottom of the tank.

In another aspect, the mixing apparatus according to the present disclosure is used for mixing particles in a liquid. By particles in a liquid is herein meant a slurry, dispersion, sludge or similar composition, where there are at least two phases and at least one of them is liquid and at least one of them is solid or semi-solid. Typically the density difference of the particles and the liquid in which they are dispersed is such, that the particles have a tendency of sinking. The liquid and the particles suspended in it can be very different types of liquids and particles. The benefits of the invention are apparent in all situations where the particles have tendency of sedimenting to the bottom of the vessel at a rate that is faster than desired for the intended application.

By alternate consecutive ridges and valleys is herein meant a pattern in which some of the parts of the corrugated formation are higher than some other parts. The ridges and valleys are to be understood as describing formations that inherently have a length, and a height difference. They cannot be separated from each other as structures, as the sides of the valley can simultaneously be seen as the sides of the ridges.

In one embodiment, the tank is a cylinder or a right prism. The overall shape of the tank is typically a cylinder, which is the most favorable form from the point of view of material consumption and strength requirements relating to the hydrostatic pressure of the tank. The tank can alternatively have the shape of a right prism with a polygonal cross section, such as an octagon. This tank shape might facilitate the installation of the corrugated formation as no arched parts would be needed to fit against each other. In the case of a prism-shaped tank, the wall can be formed of straight plates attached to each other through, for example, welding. Alternatively, the wall can be formed of one or more bent plates.

The bottom is the lowermost portion of the tank and is substantially horizontal in its overall orientation. In one embodiment, the corrugated formation is an integral part of the bottom, a separate part on the bottom or forms the bottom. There are several alternatives on how to manufacture the tank bottom. The selection of the appropriate method depends on the tank dimensions and on the process for which the mixing apparatus is designed. It is possible to construct the bottom and the corrugated formation separate but to attach them to each other so, that the corrugated formation forms an integral part of the bottom. It is equally possible to leave the parts separate or separable. In some applications, it might be possible to equip the tank bottom with the corrugated formation so, that the parts are indistinguishable. A simple alternative is to mount a desired number of pressed pieces forming the ridges on a flat-bottomed mixing tank bottom. Alternatively, a single pressed piece containing the corrugated formation can be mounted on a flat-bottomed mixing tank bottom, for example.

The corrugated formation according to the present disclosure can be installed in a pre-manufactured tank, which can already have been taken into use. The tank can have a flat bottom. The corrugated formation can as well be introduced in to the tank already during its manufacture.

The tank can have inlets, outlets, a discharge pipe, a cover and/or other equipment depending on the specific application. Their design belongs to the competence of a skilled person.

In one embodiment, the mixing apparatus is made of metal, such as steel or titanium, fiber reinforced plastic, such as glass fiber, or the combination thereof. The tank is usually made of steel. All the metal parts of the mixing apparatus can be coated with other materials, such as rubber, fiber reinforced plastic or their combinations. In some applications it might be beneficial to construct the tank of steel and install the corrugated formation as a separate piece made of another material as on the bottom of the tank, or vice versa.

The agitation means comprises a shaft that is powered by a motor, many types of which are known in the art, and an impeller attached to or near the tip of the shaft. The impeller rotates to move the liquid in the tank and thus to suspend solids in it. The impeller is a downward pumping axial or mixed flow impeller. In one embodiment, the impeller is a hydrofoil impeller, a propeller or a pitched-blade turbine. The material and other specific characteristics, such as blade size, angle of attack and rotation speed of the agitation means can be determined by the skilled person for each application. The agitation means functions with baffles to create sufficient liquid movement and to direct it in order to suspend the solids. In one embodiment, the tank comprises at least one vertical baffle mounted to the side wall substantially above the highest point of the ridge for directing the flow of the liquid to be mixed. Typically, there is a baffle above each ridge of the corrugated formation. The baffle does not need to be exactly aligned with the highest point of the ridge, as long as it directs the flow of the liquid sufficiently. The design specifics of the baffles for different applications belong to the knowledge of the skilled person.

In one embodiment, the corrugated formation comprises at least two ridges and a corresponding number of valleys, preferably at least four ridges and corresponding number of valleys. The number of ridges and valleys can be chosen from a range starting from two and extending up to 12. In a typical situation, there are four ridges and four corresponding valleys at the bottom of the tank. Especially in large tanks, the size of the structures increases so, that it might be more feasible to construct more, and thus slightly smaller, ridges and valleys. There can be an even or an odd number of ridges and valleys. Usually they are arranged in a radial symmetry in respect to each other. In some applications, deviation from radial symmetry might be beneficial. However, the ridges and corresponding valleys extend radially in relation to the tank bottom meaning that they lie along the radius of the tank bottom. This feature is independent of whether the ridges and corresponding valleys are radially symmetrically arranged in respect to each other. Typically, when seen from above, the ridges and corresponding valleys are straight.

The length and width of the ridges and valleys can vary, as long as they sufficiently concentrate the mixing power. In one embodiment, the length of each ridge and valley is at least ⅔ of the radius of the bottom. In one embodiment, at least one of the valleys and ridges extends the whole length between the center of the bottom and the side wall. Depending on the application, the necessary length required for sufficient concentration of mixing power varies. In some applications, ⅔ of the length of the radius is enough, but in others, it might be necessary to have the ridges and valleys extend the whole length of the radius. Usually all ridges and valleys have an equal length, but this is not necessary. It is possible that one or some of the ridges and valleys are longer than the others. In a more typical situation, all the ridges and valleys extend the whole length between the center of the bottom and the side wall.

In one embodiment, the ridges and valleys extend from the side wall to the direction of the center of the bottom. In a typical situation, the ridges and valleys end at the side wall of the tank. As explained above, the length of the ridges and valleys can vary, and when they touch the side wall, they do not necessarily need to extend all the way to the center of the tank in order to fulfill their function.

By a floor of the valley, or a valley floor, is herein meant the lowest part of the valley. It can be extremely narrow in a case where the adjacent ridges meet at the floor of the valley. There can alternatively be a flat or a concave (U-shaped) valley floor in cases where there is some distance between adjacent ridges. The width of the valley floor can differ in different positions along the valley.

In one embodiment, a floor of at least one of the valleys is horizontal for its entire length. In another embodiment, the floor of at least one of the valleys is at an angle to horizontal in the direction of the valley. In a typical situation, all valleys in a corrugated formation have a similar shape, but it is not necessary for the function of the mixing apparatus according to the present disclosure. In a case where the valley floor is horizontal, it can be on the same level with the tank bottom or it can be elevated. Practical aspects in tank construction for each application determine what is their best relative position and this evaluation is within the competence of the skilled person.

In some cases the ridge has a constant height throughout its length. In one embodiment, the height of the ridge is 0.1-1 times the radius of the bottom, preferably 0.35 times the radius of the bottom. The height of the ridge is measured from the top of the ridge to the lowest point of the valley floor. However, in cases where the bottom and the lowest point of the valley floor are substantially at the same level, either of them can be used to measure the height of the ridge. By the top of the ridge is herein meant the highest point of the cross section of the ridge.

In one embodiment, the height of at least one of the ridges decreases when moving from the side wall towards the center of the bottom of the tank. In a typical situation, the height of all the ridges decreases when moving from the side wall towards the center of the bottom of the tank, but it is not necessary for the function of the corrugated formation according to the present invention. In one embodiment, the highest point of the ridge is at a height of 0.1-1 times the radius of the bottom, preferably 0.35 times the radius of the bottom. From this value, the height of ridge can decrease either to zero or the ridge can have a height above the lowest point of the valley floor at its ending point. The lowest point of the ridge, i.e. the point where the top of the ridge is closest to the valley floor, can be either at the center of the tank or some distance from it. The height of the ridge is measured from the highest point of the ridge to the lowest point of the valley floor. However, in cases where the bottom and the lowest point of the valley floor are substantially at the same level, either of them can be used to measure the height of the ridge. Further, if the valley floor is at an angle to horizontal in the direction of the valley, the height might alternatively be measured from the highest point of the valley floor. This is to ascertain sufficient guiding efficiency of the liquid, as an angled valley floor might have advantages in channeling the liquid flow, but also the ridges contribute significantly to the guiding efficiency in these situations. It is therefore important, that also when the valley floor is at an angle, the ridge has a sufficient height of at least 0.1 times the radius of the bottom, preferably 0.35 times the radius of the bottom. Typically, the floor of the valley slopes parallel to the top of the ridge.

In one embodiment, the height of the ridge decreases so, that the ridge has a radial profile of a straight line, a convex or a concave curve or a line with one or more bends. This means that the top of the ridge can form a slope that is either straight, curved or has one or more bends within the length of the ridge. In one embodiment, the cross section of each ridge, when seen from the direction of the side wall towards the center of the tank, is a triangle, a triangle with at least one concave side, a triangle with at least one convex side, a triangle with a rounded tip, a semicircle, an arc or a combination of them. Typically, the cross section has bilateral symmetry so, that both sides of the ridge have the same shape. The top of the ridge is sharp, but also a rounded top is possible. Further, usually all the ridges in a tank are of the same shape, which, however, is not necessary. The shape of the ridge is reflected in the shape of the valley. Therefore, what is said above about the shape of the ridge applies to the shape of the valley.

It is possible to combine the above-mentioned features of the corrugated formation in many ways. For example, the ridges and valleys can extend the whole length between the center of the tank and the side wall, while the valley floor is sloped and the top of the ridge is at a constant height. Alternatively, while other features remain same, the ridge can be sloped at an angle that is either equal to that of the valley floor or differs from it.

A typical corrugated formation according to the present disclosure has four ridges and corresponding number of valleys organized so, that each of the ridges is at a right angle to the two adjacent ridges. The ridges and valleys extend the whole length between the side wall and the center of the tank. The ridge at the side wall has a height of 0.35 times the radius of the cylindrical tank. The height of the ridge decreases towards the center so, that as the ridges meet at the center, their height has decreased to zero. The valleys between the ridges have a horizontal floor which is substantially at the level of the bottom of the tank. The cross section of the ridges forms a triangle when seen from the direction of the side wall towards the center of the tank.

To summarize what is presented above, as long as the ridges and valleys enhance the flow of the liquid to be mixed, there are numerous alternatives for their design. The suitable length, height, shape and number of ridges and valleys depends on the flow pattern in the tank and the properties of the liquid to be mixed. These are interconnected with the type, size and speed of the impeller as well as the process in which the mixing apparatus is being used. Therefore, the specifics are to be determined for each application of the mixing apparatus and their design belongs to the competence of the skilled person based on this disclosure.

In one embodiment, the mixing apparatus is meant to be used in a hydrometallurgical process. By hydrometallurgical process is herein meant the extraction of metals from ores using aqueous processes. For example the leaching of minerals from ore and the conditioning of the slurry for flotation requires mixing. In one embodiment, the mixing apparatus is a flotation conditioner tank, filter feed tank or a gold cyanide leaching tank.

The benefits of the current invention are well manifested, for example, in cyanide leaching of gold. In this process, gold is absorbed in active carbon. The ore particles are rather large and the mixing power needs to be kept high in order to avoid the sedimentation of the ore. On the other hand, the higher the mixing speed, the greater the loss of gold due to grinding of the active carbon.

Generally, all processes in which heavy particles, for example particles having a density of or above 1 kg/L and average diameter of or larger than 20 µm, are mixed can benefit from a tank bottom structure according to the present disclosure. In one embodiment, the particles have a density of at least 1 kg/L, preferably at least 2 kg/L. In one embodiment, the particles have an average diameter of 20-5,000 µm, preferably 100-200 µm. In mining industry, which might be especially suited for practical applications of the mixing apparatus according to the present disclosure, mixing solutions typically have such particle properties. In another embodiment, the density of the liquid to be mixed is 1-1.5 kg/L. In another embodiment, the solids content of the liquid to be mixed is 10-80% by weight, typically higher than 30% by weight.

In addition, the volumes to be handled in mining industry are large and therefore also the potential for energy saving is significant. In one embodiment, mixing particles in a liquid belongs to a hydrometallurgical process. In another embodiment, mixing particles in a liquid is flotation conditioning, filter feed slurry agitation or gold cyanidation.

The mixing apparatus and its use according to the present disclosure offer at least one of the following advantages over prior art:

An advantage of the mixing apparatus according to the present disclosure is that it improves solids suspension properties of the tank compared to traditional flat and dished-bottom tanks. With a given impeller speed, there is an increase in the flow speed of the liquid in the immediate vicinity of the mixing tank bottom. This reduces the settling of the solids. The corrugated formation also directs the downward flow generated by the impeller smoothly upwards increasing the upward flow speed and thus the effective mixing volume, as also the liquid higher up in the tank moves more. There is also a decrease in the volume of stagnant zones in the mixing tank.

Another advantage is that the same mixing efficiency will be achieved with smaller energy input.

Another advantage is that with the same energy input, a better mixing efficiency will be achieved.

A further advantage is that the corrugated formation is easier or cheaper to build than a dished bottom.

An advantage of the mixing apparatus according to the current disclosure is that a discharge pipe can be installed directly to tank wall as easily as in flat-bottomed tank.

A further advantage is that a smaller impeller and a cheaper agitator can be used. Also the mechanical strain on the agitator components is smaller.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1A:
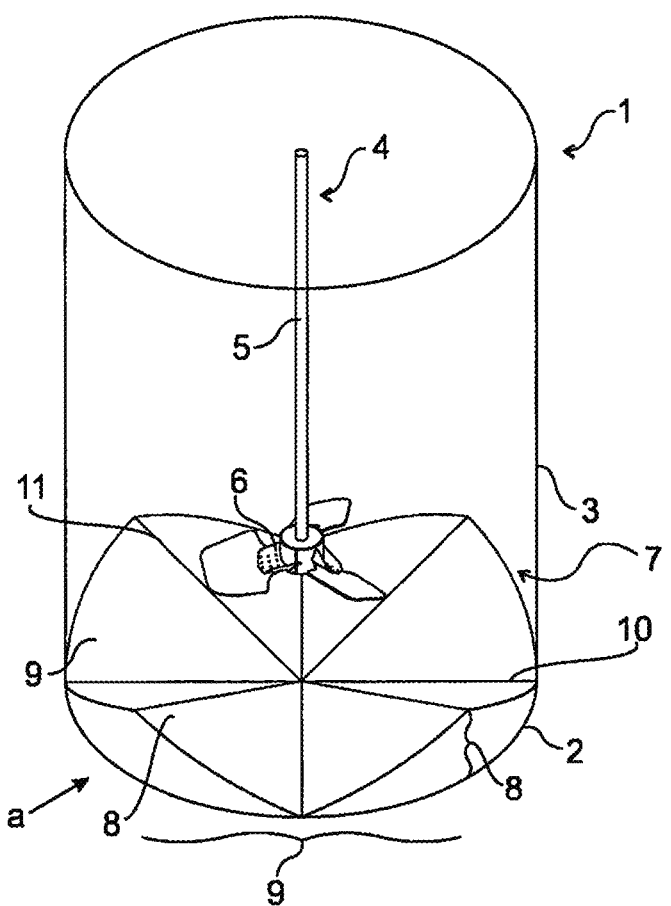
FIG. 1A is an axonometric illustration of a mixing apparatus according to the present disclosure with four ridges and corresponding valleys.

FIG. 1A presents an embodiment of the mixing apparatus according to the current disclosure as an axonometric illustration. In FIG. 1A, as in the following figures, structural details have been omitted for clarity. The mixing apparatus according to the current disclosure comprises a tank 1 having a bottom 2 and a wall 3. The bottom 2 is circular and the tank 1 is a right circular cylinder. The mixing apparatus further comprises agitation means 4 which comprises a rotation shaft 5 and an impeller 6. In FIG. 1A, the impeller 6 is a downward pumping hydrofoil impeller. The dimensions of the tank 1 and the agitation means 4 can vary according to the specific application for which the mixing apparatus is being used. At the bottom 2 of the tank 1, there is a corrugated formation 7. The corrugated formation 7 has four ridges 8 and corresponding valleys 9 positioned so that the angle between two neighboring ridges 8 and corresponding valleys 9 is the same for all ridges 8 and corresponding valleys 9. All the ridges 8 extend from the side wall 3 to the center of the bottom 2. They are sloped so, that the top 11 of the ridge 8 at the wall 3 is at a height which is ⅓ of the radius of the bottom 2. The slope has a constant angle for the entire length of the ridge 8, i.e. the top 11 of the ridge 8 forms a straight line. At the center of the bottom 2 where the ridges 8 meet, their height is zero. The cross-section of a ridge 8 has a profile of a triangle. The valley floor 10 is horizontal throughout its length and the length equals the radius of the tank bottom 2. The neighboring ridges 8 meet at the valley floor 10, so that the valley floor 10 remains narrow throughout its length. In this embodiment, the corrugated formation 7 is constructed so, that it lies directly over the flat bottom 2 of the tank 1. Therefore, the the valley floor 10 and the tank bottom 2 are substantially at the same level.

When particles in a liquid are mixed in a mixing apparatus displayed in FIG. 1A, the rotation shaft 5 rotates the impeller 6, which creates a liquid flow that is substantially towards the bottom 2 of the tank 1. Without limiting the invention to any specific theory, the corrugated formation 7 directs the flow of the liquid and increases the liquid flow velocities in the vicinity of the bottom 2 improving the suspension of the particles in the liquid. The corrugated formation 7 also increases the upward flow velocities along the tank wall 3, increasing the portion of the liquid volume having high enough velocity to keep the particles suspended. There are no baffles 12 drawn in FIG. 1A, but in most applications they are used. They, in addition to their possible other functions, further assist in directing the flow of the liquid upwards along the wall 3 of the tank 1.

Figure 1B:
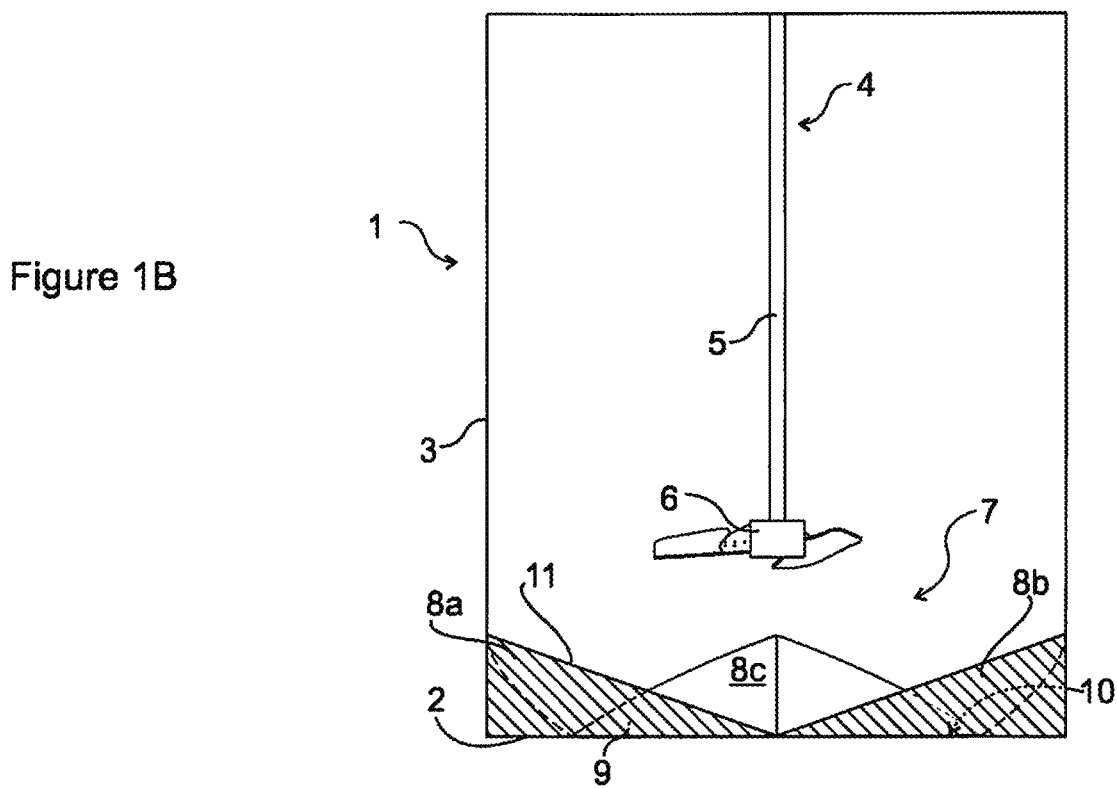
FIG. 1B is a schematic view of the mixing apparatus of FIG. 1A as a longitudinal section in the direction of arrow a in FIG. 1A.

FIG. 1B displays the tank 1 of FIG. 1A as a longitudinal section along arrow a in FIG. 1A. Features located that cannot be seen from this angle are depicted with dashed lines. In FIG. 1B, three ridges 8 (marked as 8a, 8b and 8c) are displayed. Two ridges, 8a and 8b, that face each other are shown along the top 11 of the ridges 8a and 8b. Ridge 8c which is at a straight angle to the two other ridges 8a, 8b is visible in the middle of the tank 1. There are two valleys 9 visible in FIG. 1B behind the two ridges 8a, 8b. The bottom 2 of the tank 1 is shown at the same level with the floor 10 of the valleys 9. The dashed lines show how the neighboring ridges, 8a, 8c, and 8b, 8c, meet at the floor 10 of the two valleys 9. Further, it is shown how the height of all ridges 8a, 8b, 8c decreases from the wall 3 towards the center of the tank 1 so, that the tops 11 of the ridges 8a, 8b, 8c meet at the center of the bottom 2 of the tank 1. The agitation means 4 is located at the center of the tank 1. The rotation shaft 5 extends from the top of the tank 1 downwards and the impeller 6 is mounted at a height of ½ times the radius of the tank 1 above the center of the bottom 2 of the tank 1.

Figure 1C:
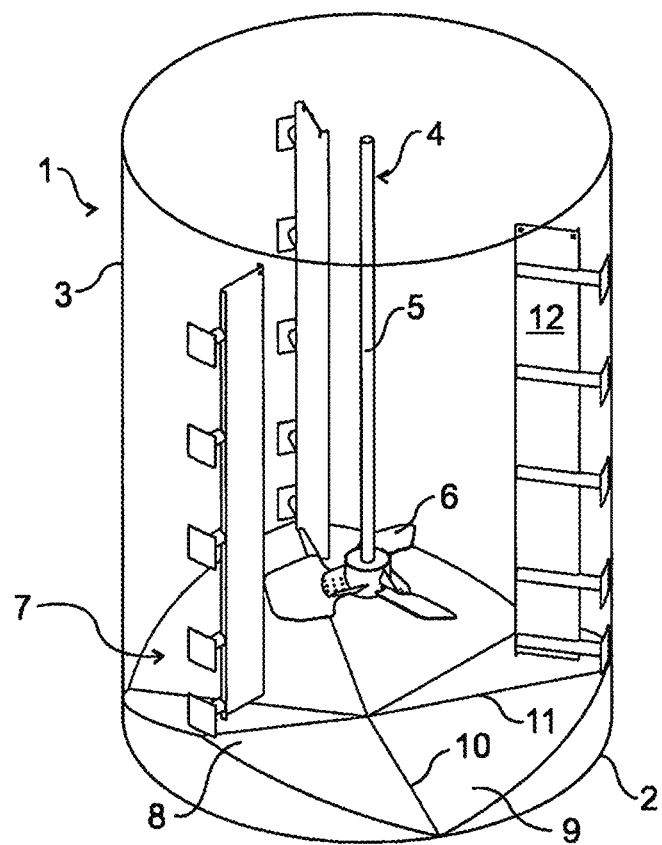
FIG. 1C is an axonometric illustration of a mixing apparatus according to the present disclosure with 3 ridges and corresponding valleys.

FIG. 1C displays an embodiment of the mixing apparatus according to the current disclosure as an axonometric illustration. It is similar to the embodiment displayed in FIGS. 1A and 1B, but it comprises three ridges 8 and corresponding valleys 9. The ridges 8 and corresponding valleys 9 are radially symmetrically situated, i.e there is an angle of 120° between each neighboring ridge 8 and corresponding valley 9.

Further, the embodiment in FIG. 1C comprises baffles 12 mounted above each ridge 8. The baffles 12 are constructed as known in the art and the selection of their characteristics belongs to the knowledge of the skilled person. It is depicted in FIG. 1C how the baffles 12 are attached to the wall 3 of the tank 1 above the top 11 of each ridge 8. Without limiting the invention to any specific theory, the location of the baffles 12 helps to direct the flow of the liquid.

Figure 1D:
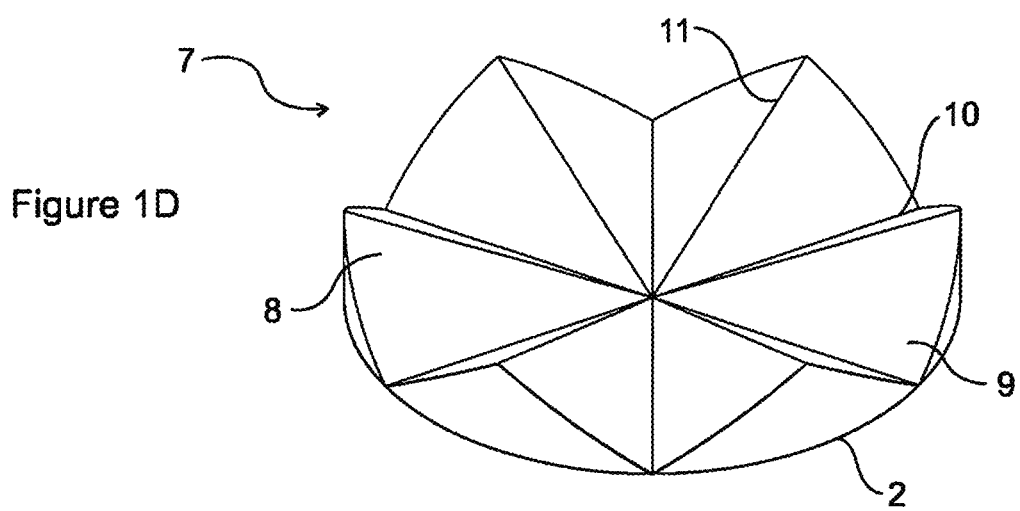
FIG. 1D is an axonometric illustration of a corrugated formation according to the present disclosure with 6 ridges and corresponding valleys.

FIG. 1D depicts a corrugated formation 7 according to the present disclosure. It comprises six ridges 8 and corresponding valleys 9 extending radially in relation to the center of the bottom 2. All the ridges 8 slope downwards from the tank 1 wall 3 and meet at the center of the bottom 2. The corrugated formation 7 with, for example, 6, 8, 9 or 12 ridges 8 and corresponding valleys 9 might be preferable if it is to be used in an tank 1 with a large diameter of the bottom 2. It might be easier to construct such a corrugated formation 7 when individual parts remain smaller. FIG. 1D further displays a part of the bottom 2 of the tank 1. However, the bottom 2 is portrayed in FIG. 1D only to provide orientation. The corrugated formation 7 according to the present disclosure can be constructed separately from the bottom 2 of the tank 1. The corrugated formation 7 according to the present disclosure is retrofittable to existing mixing apparatuses or it can be introduced in the tank already during construction. There are a number of ways to construct a tank 1 bottom 2 with a corrugated formation 7 according to the present disclosure and the selection of a suitable method is within the knowledge of the skilled person based on this disclosure.

In all the embodiments of FIGS. 1A-1D, the ridges 8 have a straight sloping radial profile, i.e. the top 11 of the ridge 8 is a straight line that descends from the wall 3 end of the ridge 8 towards the center of the bottom 2. In FIGS. 1A-1D, the cross section of the ridge 8 is a triangle, i.e. also the sides of the ridge 8 were straight. However, this is not necessary and all embodiments can be implemented with other shapes as well.

FIGS. 2A-2F depict some possible shapes of the corrugated formation 7 according to the present disclosure. In FIGS. 2A-2F, a longitudinal section of the bottom part of a tank 1 with a corrugated formation 7 is displayed. The corrugated formation 7 comprises four ridges 8 and corresponding valleys 9. However, the different shapes depicted in FIGS. 2A-2F could be implemented in a corrugated formation 7 with any number of ridges 8 and corresponding valleys 9. In FIGS. 2A-2F, longer dashes are used for depicting the shape of the ridges 8 at both sides of the corrugated formation 7 and shorted dashes for depicting the shape of the ridge 8 at the center of the corrugated formation 7 (i.e. the one furthest away from the viewer).

Figure 2:
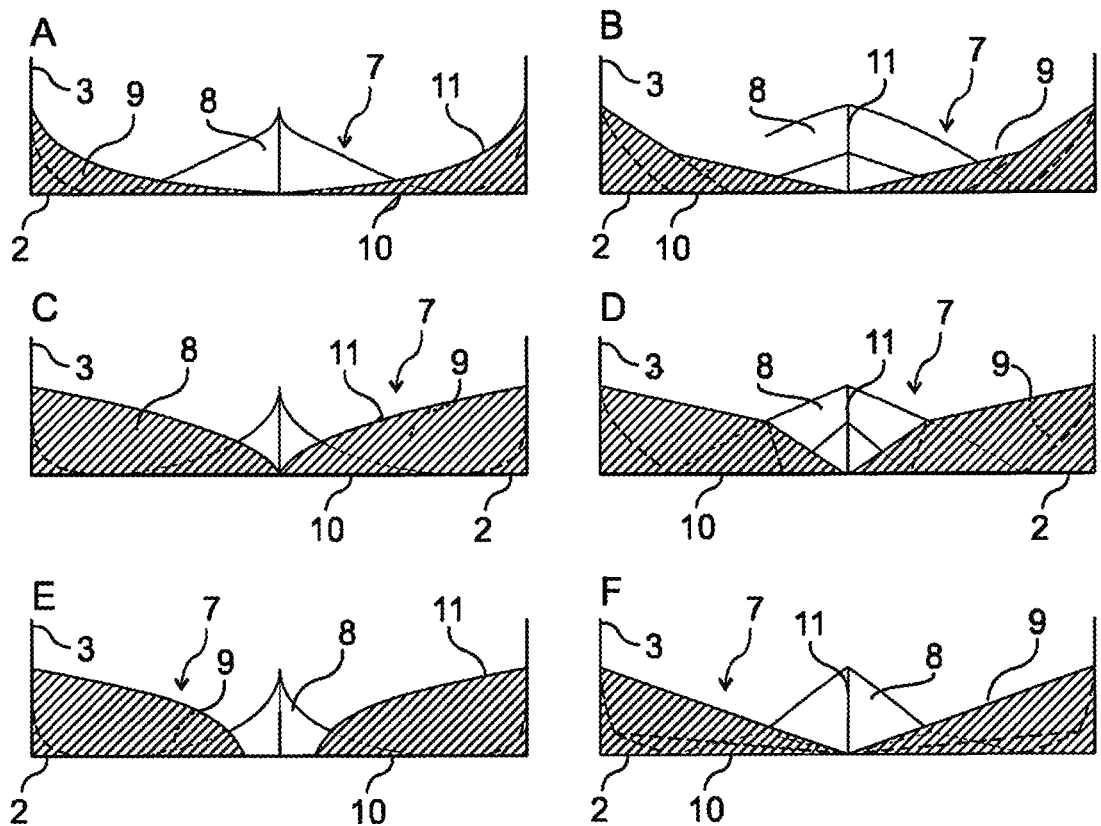
FIGS. 2A-2F depict some possible shapes of the corrugated formation showing radial profiles of two ridges opposite to each other.

In FIG. 2A, the top 11 of the ridge 8 has a concave shape when viewed from the side. The sides of the ridge 8 are not straight, but also have a slightly concave profile.

In FIG. 2B, the top 11 of the ridge 8 has a sharp bend, i.e. a change in inclination. The ridge 8 slopes towards the bottom 2 faster near the wall 3. On the side of the bend which is closer to the center of the tank 1 bottom 2, the ridge 8 slopes more slowly. The overall shape of the ridge 8 can be thought as approximating a concave shape. The bend is also present at the sides of the ridge 8, but the part of the ridge 8 that is at the wall 3 follows the contour of the wall evenly.

In FIG. 2C, the top 11 of the ridge 8 has a convex shape when viewed from the side. The sides of the ridge 8 have a concave profile.

In FIG. 2D, the top 11 of the ridge 8 has a sharp bend, i.e. a change in inclination. The ridge 8 slopes towards the bottom 2 slower at its wall 3 end. On the side of the bend which is closer to the center of the tank 1 bottom 2, the ridge 8 slopes more steeply. The overall shape of the ridge 8 can be thought as approximating a convex shape. The bend is also present at the sides of the ridge 8, but the part of the ridge 8 that is at the wall 3 follows the contour of the wall evenly.

In FIG. 2E, the shape of the ridges 8 is similar to that in FIG. 2C, but the ridges 8 do not reach all the way from the wall 3 to the center of the bottom 2. In this embodiment, they are approximately 85% of the radius of the bottom 2. The height of the ridges 8 at the wall 3 is similar to FIGS. 2A-2D, i.e. ⅓ of the radius of the bottom 2.

In FIG. 2F, the top 11 of the ridge 8 forms a straight line from the wall 3 to the center of the bottom 2. In this embodiment, the sides of the ridges 8 have a sharp bend.

In summary, the ridges 8 and corresponding valleys 9 can have many different shapes as long as sufficient guiding efficiency for the liquid is achieved. This depends on the specific application for which the corrugated formation 7 according to the present disclosure is used.

FIGS. 3A-3D depict schematic presentations of cross sectional profiles of the ridges 8 in a corrugated formation 7 according to the present disclosure. The ridges 8 and corresponding valleys 9 are viewed from the outside of the tank 1 wall 3, in the direction of the arrow a in FIG. 1A. FIGS. 3A-3D are not in perspective and present two neighboring ridges 8 as being on a plane.

Figure 3:
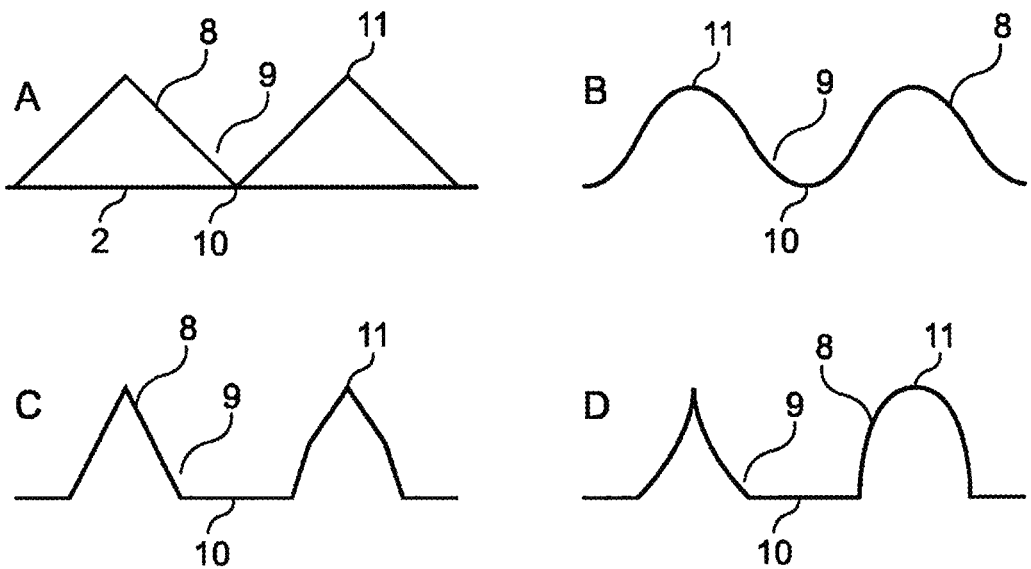
FIGS. 3A-3D are schematic presentations of some possible shapes of the corrugated formation shown from the direction of the tank wall (arrow a in FIG. 1A).

In FIG. 3A, the cross section of the ridges 8 is a triangle and the floor 10 of the valley 9 is extremely narrow, as the neighboring ridges 8 meet at the floor 10 of the valley 9. The top 11 of the ridge 8 is sharp. In FIG. 3A, also the bottom 2 of the tank 1 is visualized and is at the same level with the floor 10 of the valley 9. It is omitted from FIGS. 3B-3D.

In FIG. 3B, the ridges 8 and corresponding valleys 9 have a curved cross sectional profile. The top 11 of the ridge 8 as well as the floor 10 of the valley 9 are not sharp as in FIG. 3A.

In FIG. 3C, the two ridges 8 are of different shape. This, although possible for the functioning of the corrugated formation 7 according to the present disclosure, is probably rare in practice. The main purpose of FIG. 3C is to present two further alternatives for the shape of the ridges 8 according to the present disclosure. First, as in FIG. 3A, the ridge 8 on the left has a cross sectional profile of a triangle. The ridge 8 on the right, has a cross sectional profile with a bend (cf. FIG. 2F where the bend is in another direction). Further, in FIG. 3C, the floor 10 of the valley 9 is broad and flat, as there is space between the two neighboring ridges 8.

FIG. 3D depicts two further embodiments of the ridges 8 according to the present disclosure. The sides of the ridge 8 can be concave, as in the ridge 8 on the left, or they can have a convex profile as in the ridge 8 on the right. The ridge 8 on the right has a rounded top 11.

The above-listed shapes are not meant to exhaust all the possible shapes in which the corrugated formation 7 according to the present disclosure can be embodied. They are only to provide examples of possible alternatives, and others can be envisaged.

Figure 4:
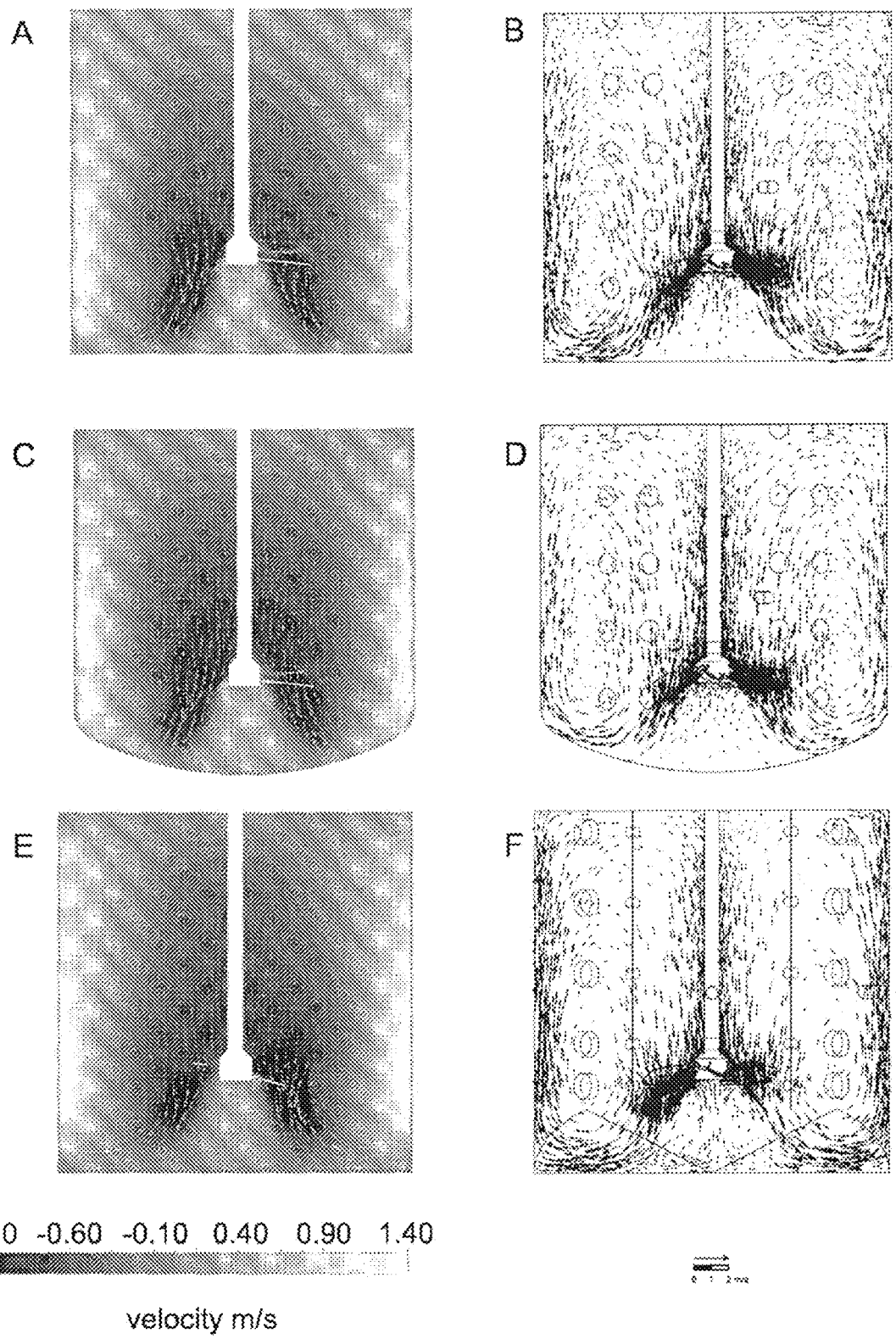
FIGS. 4A-4F depict CFD-models of the enhancement of flow speeds in a mixing apparatus according to the present disclosure presented as longitudinal sections of the tank.

FIGS. 4A-4F depict a CFD-model of the enhancement of the flow speeds in a mixing apparatus according to the present disclosure presented as a longitudinal section of the tank. In FIGS. 4A, 4C and 4E, the flow speeds are depicted in grayscale, a lighter color meaning faster flow speed. A scale bar is provided at the bottom of the figure. In the scale bar, negative values indicate flow speeds towards the bottom and positive values towards the surface of the liquid being mixed. In FIGS. 4B, 4D and 4F, the flow speeds are depicted with velocity arrows, a longer arrow meaning faster flow speed. A scale bar is provided at the bottom of the figure. In all figures, mixing parameters, such as impeller speed and properties, and slurry characteristics were equal. The impeller and the rotation shaft are visible at the center of each of FIGS. 4A-F. In FIG. 4F, two ridges according to the present disclosure are sketched at the bottom of the tank.

FIGS. 4A and 4B illustrate the flow speed in a flat-bottomed tank, FIGS. 4C and 4D in a dished-bottom tank and FIGS. 4E and 4F in a tank according to the present disclosure. It can be seen in FIGS. 4A-F that the volume of higher flow speeds is slightly larger in a dished-bottom tank than in the flat-bottomed tank. However, the volume of higher flow speeds increases further in a tank with a corrugated formation according to the present disclosure, especially in the upper half of the tank in the vicinity of the tank walls.

Figure 5:
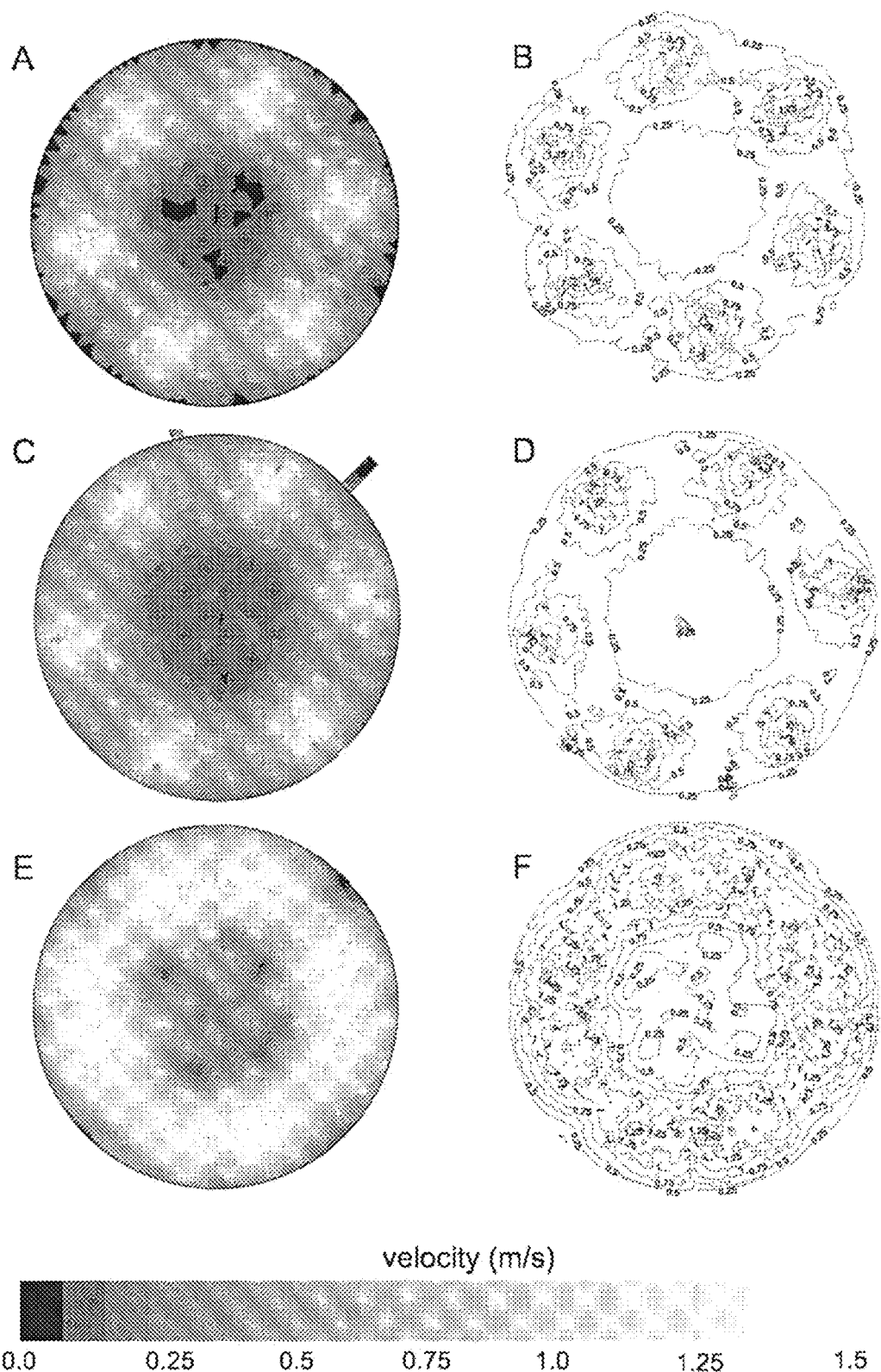
FIGS. 5A-5F depict CFD-models of the enhancement of flow speeds in a mixing apparatus according to the present disclosure presented as cross sections above the bottom of the tank.

FIGS. 5A-5F depict a CFD-model of the enhancement of flow speeds in a mixing apparatus according to the present disclosure presented as a cross section at 85 mm above the bottom of the tank. The figures illustrate a tank with a diameter of 8500 mm and solution depth of 8500 mm. The impeller diameter is 3458 mm and rotation speed 32 rpm. In FIGS. 5A, 5C and 5E, the flow speeds are depicted in grayscale, a lighter color meaning faster flow speed. A scale bar is provided at the bottom of the figure. In FIGS. 5B, 5D and 5F, the flow speeds are depicted with equal speed contours. In all figures, mixing parameters, such as impeller speed and properties, and slurry characteristics are equal.

FIGS. 5A and 5B illustrate the flow speed in a flat-bottomed tank, FIGS. 5C and 5D in a dished-bottom tank and FIGS. 5E and 5F in a tank according to the present disclosure. It is evident from FIGS. 5A-F that the flow speeds at 85 mm above the bottom of the tank vary between different tank bottom configurations. The flow speeds are lowest in a tank with a flat bottom and they increase to some extent with a dished-bottom tank. However, with a corrugated formation according to the present disclosure, a clear positive difference to the other two is attainable: flow speeds above approximately 1 m/s do not form separate areas with this configuration, but instead the majority of the bottom is covered with flow velocities of 1 m/s and higher.

Figure 6:
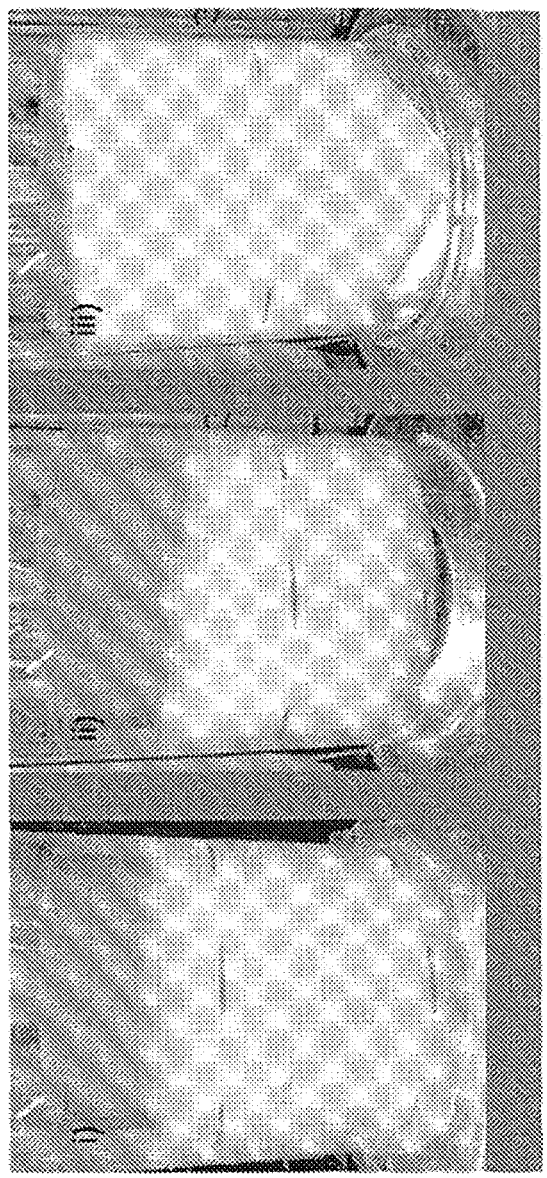
FIG. 6 illustrates the increase in the effective mixing volume in a mixing apparatus according to the present disclosure.

FIG. 6 demonstrates the increase in the effective volume when a corrugated formation according to the present disclosure is used at the bottom of a mixing tank. With effective volume is herein meant the volume in which the solids are suspended relative to the whole volume occupied by the liquid (i.e. the slurry volume).

The experiment was conducted with laboratory-scale equipment with an OKTOP 3200 axially downward pumping hydrofoil impeller with a diameter of 154 mm. Tank i) had a flat bottom, tank ii) a dished bottom and tank iii) was equipped with a corrugated formation according to the current disclosure. All tanks had a diameter of 362 mm and were loaded with 37.3 L water. Thus the liquid depth varied, being largest in tank iii) and smallest in tank i) with a flat bottom. The solution to be mixed contained 400 g/L quartz sand as the solid component. The particle diameter of the solid matter was 125-185 µm corresponding to typical particles in hydrometallurgical applications. The tank dimensions, impeller and its rotation speed and baffle configuration were kept constant.

As can be seen in FIG. 6, in tank i), the particles are suspended in only a portion of the liquid volume, the effective volume being about 70% of the total slurry volume. The effective volume remains approximately the same in tank ii) with a dished bottom. However, with the mixing conditions in the experiment, in tank iii), the effective volume increased to 94% of the slurry volume. Conversely, under the same conditions, it was observed that the impeller speed in which all particles are in motion and none of them remain on the bottom of the tank more than transiently (the so-called just-suspended speed, Njs), is significantly lower for tank iii) (285 rpm) than for the other two (330 rpm for i) and 390 rpm for ii)).

To summarize, the mixing apparatus according to the present disclosure can produce a more efficient mixing than prior art solutions.

It is obvious to a person skilled in the art that with the advancement of technology, the basic idea of the invention may be implemented in various ways. The invention and its embodiments are thus not limited to the examples described above; instead, they may vary within the scope of the claims.

The invention claimed is:

1. A mixing apparatus for mixing particles in a liquid, the mixing apparatus comprising:
   a tank having a bottom and a substantially vertical side wall;
   an agitator comprising a rotation shaft vertically and centrally disposed in the tank; and
   an impeller arranged at a height above the bottom at the end of the rotation shaft and the impeller being a downward pumping axial flow impeller,
   wherein the bottom is equipped with a corrugated formation comprising alternate consecutive ridges and valleys, the ridges and valleys extending radially in relation to a center of the bottom, whereby the valleys concentrate and channel the mixing power at least near to the bottom to direct flow of the liquid and to increase a velocity of the flow near to the bottom, wherein at least one of the ridges has a straight upper profile, wherein a height of the upper profile decreases when moving from the side wall towards the center of the bottom of the tank, the highest point of the ridge being at a height of 0.1-1 times the radius of the bottom, and wherein a floor of at least one of the valleys is horizontal for its entire length, wherein the upper profile of the at least one of the ridges extends under the impeller, and wherein the impeller is arranged above the ridges without contacting the ridges.

2. The mixing apparatus according to claim 1, wherein the corrugated formation comprises at least two ridges and a corresponding number of valleys.

3. The mixing apparatus according to claim 1, wherein the length of each ridge and valley is at least ⅔ of the radius of the bottom.

4. The mixing apparatus according to claim 1, wherein the ridges and valleys extend from the side wall to a direction of the center of the bottom.

5. The mixing apparatus according to claim 1, wherein at least one of the ridges and valleys extends the whole length between the center of the bottom and the side wall.

6. The mixing apparatus according to claim 1, wherein the floor of at least one of the valleys is at an angle to horizontal in a direction of the valley.

7. The mixing apparatus according to claim 1, wherein the height of the ridge is 0.1-1 times the radius of the bottom.

8. The mixing apparatus according to claim 1, wherein a cross section of each ridge, when seen from the direction of the side wall towards the center of the bottom of the tank, is a triangle comprising at least one of at least one concave side, at least one convex side, a rounded tip, a semicircle, or an arc.

9. The mixing apparatus according to claim 1, wherein the corrugated formation comprises an integral part of the bottom, a separate part on the bottom or forms the bottom.

10. The mixing apparatus according to claim 1, wherein the tank comprises a cylinder or a right prism.

11. The mixing apparatus according to claim 1, wherein the mixing apparatus comprises at least one of a metal or a fiber reinforced plastic.

12. The mixing apparatus according to claim 1, wherein the mixing apparatus is meant to be used in a hydrometallurgical process.

13. The mixing apparatus according claim 1, wherein the mixing apparatus comprises a flotation conditioner tank, filter feed tank or a gold cyanide leaching tank.

14. The mixing apparatus according to claim 1, wherein the height of at least one of the ridges and the highest point of the ridge is at a height of 0.35 times the radius of the bottom.

15. The mixing apparatus according to claim 2, wherein the corrugated formation comprises at least four ridges and a corresponding number of valleys.

16. The mixing apparatus according to claim 7, wherein the height of the ridge is 0.35 times the radius of the bottom.

17. The mixing apparatus according to claim 11, wherein the metal is selected from the group consisting of steel and titanium and the fiber reinforced plastic is a glass fiber.

18. A mixing apparatus for mixing particles in a liquid, the mixing apparatus comprising:
a tank having a bottom and a substantially vertical side wall,
an agitator comprising a rotation shaft vertically and centrally disposed in the tank, and an impeller arranged at a height above the bottom at the end of the rotation shaft and the impeller being a hydrofoil impeller, a propeller, or a pitched-blade turbine,
wherein the bottom is equipped with a corrugated formation comprising alternate consecutive ridges and valleys, the ridges and valleys extending radially in relation to a center of the bottom, whereby the valleys concentrate and channel the mixing power at least near to the bottom to direct flow of the liquid and to increase a velocity of the flow near to the bottom, wherein at least one of the ridges has a straight vertex, wherein a height of the vertex decreases when moving from the side wall towards the center of the bottom of the tank the highest point of the vertex of the ridge is at a height of 0.1-1 times the radius of the bottom, and wherein a floor of at least one of the valleys is horizontal for its entire length, wherein the vertex of at least one of the ridges extends under the impeller, and wherein the impeller is arranged above the ridges without contacting the ridges.

19. The mixing apparatus according to claim 18, wherein a first ridge of the ridges has:
a first face set at a non-perpendicular angle relative to a plane defined by the bottom; and
a second face set at a non-perpendicular angle relative to the plane defined by the bottom, the first and second faces intersecting to form the vertex of the first ridge.

20. The mixing apparatus according to claim 19, wherein each of the first and second faces is flat.

21. The mixing apparatus according to claim 19, wherein the vertex of the first ridge extends from the center of the bottom to the highest point of the first ridge, and the vertex of the first ridge extends at a non-perpendicular angle relative to the plane of the bottom.

22. The mixing apparatus according to claim 21, wherein the vertex of the first ridge is linear along its length.

23. The mixing apparatus according to claim 19, wherein a second ridge of the ridges has:
a first face set at a non-perpendicular angle relative to a plane defined by the bottom; and
a second face set at a non-perpendicular angle relative to the plane defined by the bottom, the first and second faces of the second ridge intersecting at the highest point of the second ridge.

24. The mixing apparatus according to claim 23, wherein the first and second ridges are disposed adjacent one another, such that the first face of the second ridge intersects with the second face of the first ridge at a lowest point of a first valley of the valleys.

25. The mixing apparatus according to claim 24, wherein the lowest point of the first valley extends from the substantially vertical side wall to the center of the bottom and is coplanar with the plane of the bottom.

26. The mixing apparatus according to claim 19, further comprising a baffle attached to the substantially vertical side wall and extending perpendicularly relative to the plane of the bottom, wherein the baffle is longitudinally aligned with the highest point of the first ridge.

* * * * *